United States Patent [19]

Fox

[11] 4,133,547

[45] Jan. 9, 1979

[54] ENGINE COMPONENTRY

[75] Inventor: Anthony E. Fox, Ann Arbor, Mich.

[73] Assignee: Massey-Ferguson Inc., Detroit, Mich.

[21] Appl. No.: 814,584

[22] Filed: Jul. 11, 1977

[51] Int. Cl.² .............................................. B60K 13/04
[52] U.S. Cl. ............................... 180/54 A; 123/41.64;
180/64 A; 180/69 C; 181/204
[58] Field of Search ................ 180/69 C, 69 R, 64 A,
180/54 A; 123/41.64, 198 E; 181/204, 205, 224,
284

[56]  References Cited
U.S. PATENT DOCUMENTS

| 1,235,400 | 7/1917 | Waite | 180/69 R |
|---|---|---|---|
| 2,925,874 | 2/1960 | Norrie | 180/64 A |
| 3,017,944 | 1/1962 | Norrie | 180/69 C |
| 3,795,287 | 3/1974 | Rose | 180/64 A |
| 3,866,580 | 2/1975 | Whitehurst | 180/54 A |
| 3,884,322 | 5/1975 | Nemschoff | 180/69 R |
| 3,982,600 | 9/1976 | Gerresheim | 180/69 C |
| 4,011,849 | 3/1977 | Latham | 123/41.64 |
| 4,071,009 | 1/1978 | Kraina | 181/204 |

Primary Examiner—David M. Mitchell
Attorney, Agent, or Firm—William R. Nolte

[57]  ABSTRACT

An engine has a swingable hood with an exhaust stack and air inlet drain cap mounted thereon for swinging therewith which are operative with a muffler outlet and an air cleaner inlet, respectively, when the hood is in an operative position enclosing the engine of a vehicle on which the hood is mounted. A deflector is located between the muffler and air cleaner and oriented to deflect cooling air for the muffler to exhaust vents and the stack which stack forms an annulus around the muffler outlet to give a jet pump type action to enhance the draft for the stack which entrains the effluent from the muffler outlet while at the same time providing a radiant and convective heat shield for the air cleaner.

18 Claims, 3 Drawing Figures

ENGINE COMPONENTRY

The present invention relates to engine componentry and more particularly to exhaust and air inlet components of an engine. It is conventional with vehicles to protect the engine and engine componentry with a hood enclosing all of the above. Recent requirements for reduction of noise level for vehicles, particularly industrial machines, has resulted in the introduction of heavy insulating materials to the hood of vehicles. The hood is generally positionable both between an operative or closed position over the engine and an inoperative or open position to permit servicing of the engine and its componentry. When components such as a muffler are moved from outside the hood to the inside of the hood to further quiet the vehicle, the existence of the muffler within the engine compartment coupled with increasing the insulation on the hood has resulted in problems in maintaining the engine compartment at a reasonable temperature level. Additionally there were problems encountered in accommodating a reasonable point of demarcation between such components as a rain cap for an air cleaner inlet and the exhaust stack with a muffler outlet to permit the exhaust stack and rain cap to move with the hood when it was swung to its open or inoperative position while at the same time engaging the muffler outlet and air cleaner inlet, respectively, in the operative or closed position of the hood. Clearly, there is a desire to maintain separation between the air entering the air cleaner and the air cooling the muffler which mixes with the effluent from the muffler. Further considerations are minimizing heat exchange between the muffler and the air cleaner and assuring that there is generally one hundred percent removal of the effluent from the muffler outlet through the exhaust stack.

While it has been known in the prior art to provide exhaust stacks over the outlet of mufflers for purposes of entraining the products discharged from the muffler outlet, and at the same time maintaining clearance between the muffler outlet and the exhaust stack to permit the point of demarcation to exist as required when the hood mounted exhaust stack moves with the hood to its inoperative or open position, there have been problems in entraining all of the exhaust products from the muffler outlet resulting in soot and carbon deposits on the engine and its componentry.

The present invention addresses itself to the above problems and more particularly to engine componentry having its location idealized with an installation providing for optimum movement of air into and out of the engine compartment to thereby eliminate all the above problems. The above componentry includes a muffler for an engine having an inlet and an outlet and an exhaust stack mounted on a hood and swingable therewith relative to the engine. The muffler inlet is connected to the engine while its outlet exhausts to the stack when the hood is in the operative or closed position. The stack overlaps the muffler outlet and has a diameter sufficient to create an annulus between the stack and the muffler outlet where they overlap. An air cleaner having an inlet and outlet as well as a rain cover mounted on the hood is operatively connected by its inlet to the rain cover and by its outlet to the engine. The air cleaner inlet is operatively connected to the rain cap only when the hood is in its operative or closed position. A deflector is located between the muffler and the air cleaner beneath the hood and extending over the length of the muffler. The hood has a top, sides, and louvers in the top to confine the muffler and air cleaner in an engine compartment formed by the hood and engine entraping air therein to direct its flow to the louvers in the hood. An upstanding portion of the deflector directs cooling air passing the muffler to the louvers and the stack to thereby vent the air and also increase the draft of the stack by increasing the volume and the velocity of air to the annulus formed between the stack and muffler outlet thereby entraining the products discharged from the muffler outlet. A lower portion of the deflector is curved to form a smooth transition with the upstanding portion. The lower portion is generally directed into the path of the cooling air for the muffler to force the air on to the upstanding portion. The location of the deflector between the muffler and the air cleaner causes it to form a convective and radiant heat shield between the muffler and air cleaner.

The above components have the advantage of providing an engine compartment confining both the muffler and the air cleaner for the engine which is free of carbon deposits. Further, the muffler is shielded from the air cleaner to prevent heat transfer therebetween with a deflector which also provides direction to the cooling air for the muffler. The deflector further enhances the cooling of the muffler by increasing the velocity of the air past the muffler. Still another advantage is that the deflector directs air not only to exhaust louvers but to the hood mounted stack to enhance the draft of the stack by providing a type of jet pump action with the increased air flow through the stack past the muffler outlet.

A still further advantage is the compactness of the location of the muffler and air cleaner located in their nonobtrusive position beneath the hood to the vehicle. Also, the hood is maintained operative between an open and closed position to provide easy service access to the engine and its componentry while still mounting both an exhaust stack and a rain cap movable therewith which are maintained operative with the muffler and air cleaner respectively when the hood is in its operative or closed position. Finally, the enclosure of the air cleaner and muffler components within a well insulated hood provides a quieter operating vehicle which still has adequate cooling provisions to prevent overheating of the engine componentry.

The above objects and advantages of the invention will become readily apparent to one skilled in the art from reading the following detailed description of an embodiment of the invention when considered with further objects thereof in light of the accompaning drawings in which.

Figure 1:
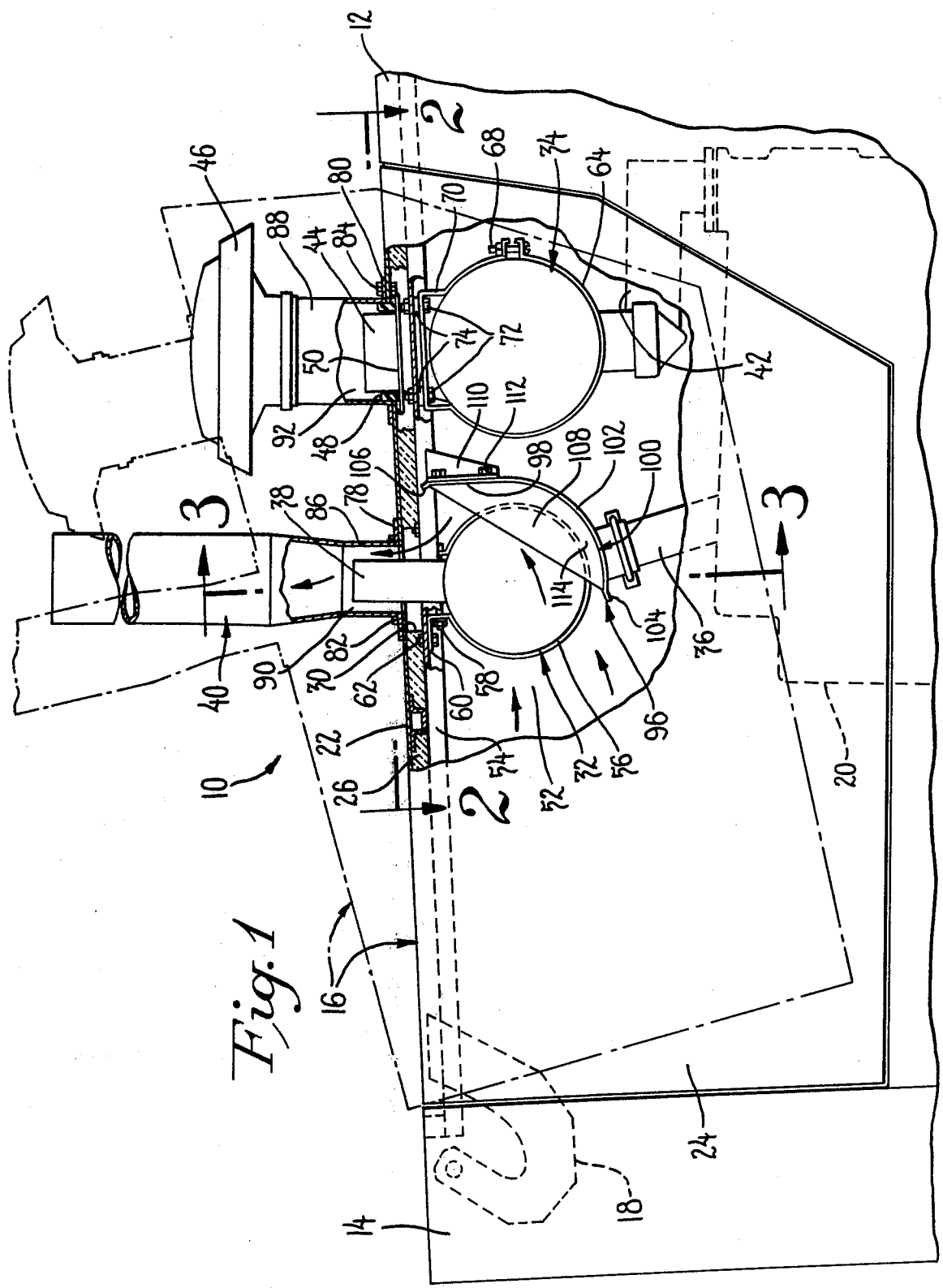
FIG. 1 is a fragmentary side elevational view of a vehicle, with parts thereof broken away for further illustration to give a view along line 1—1 of FIG. 2, embodying engine compnentry of the present invention.
Figure 2:
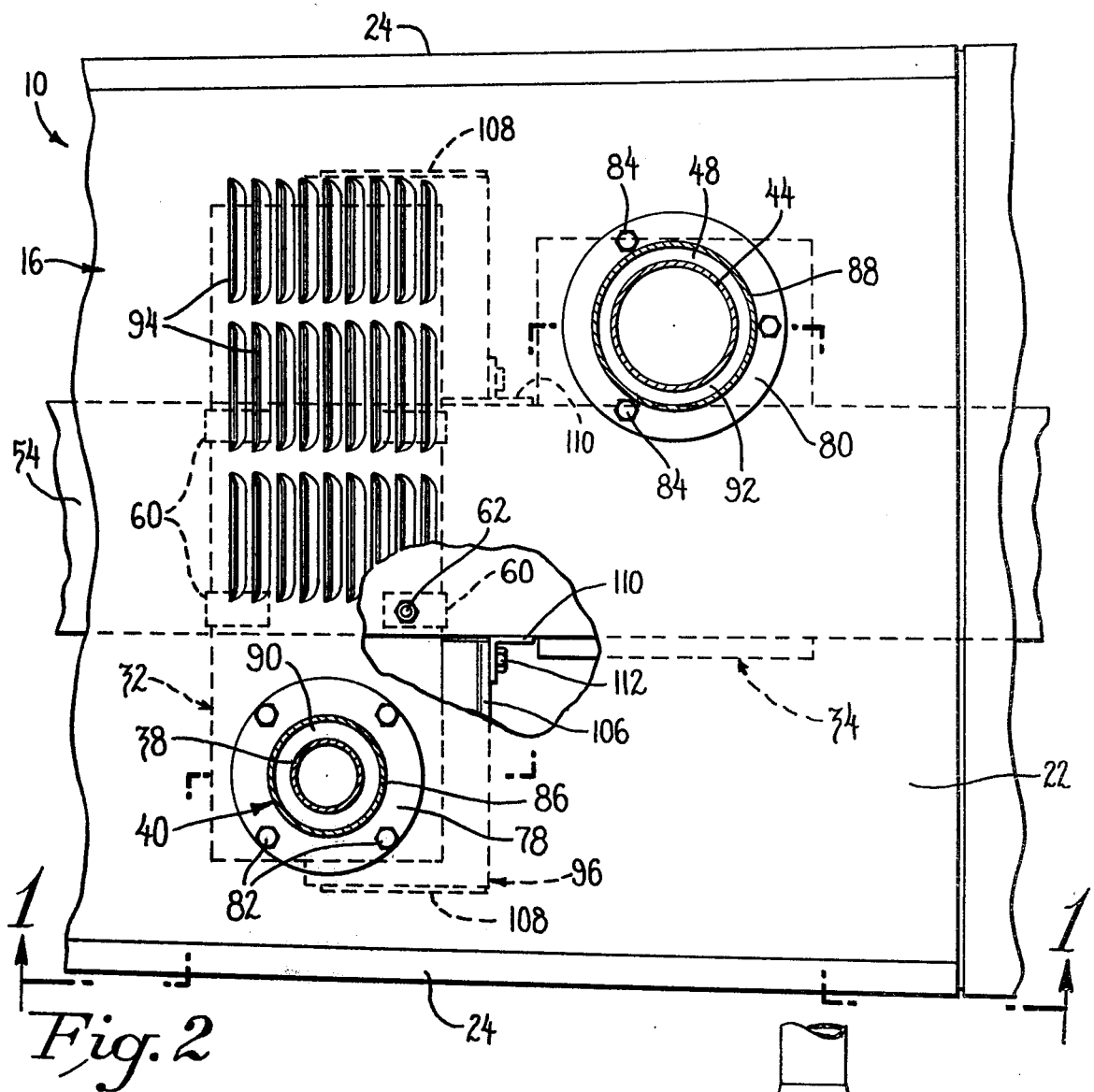
FIG. 2 is a top view along line 2—2 of FIG. 1.
Figure 3:
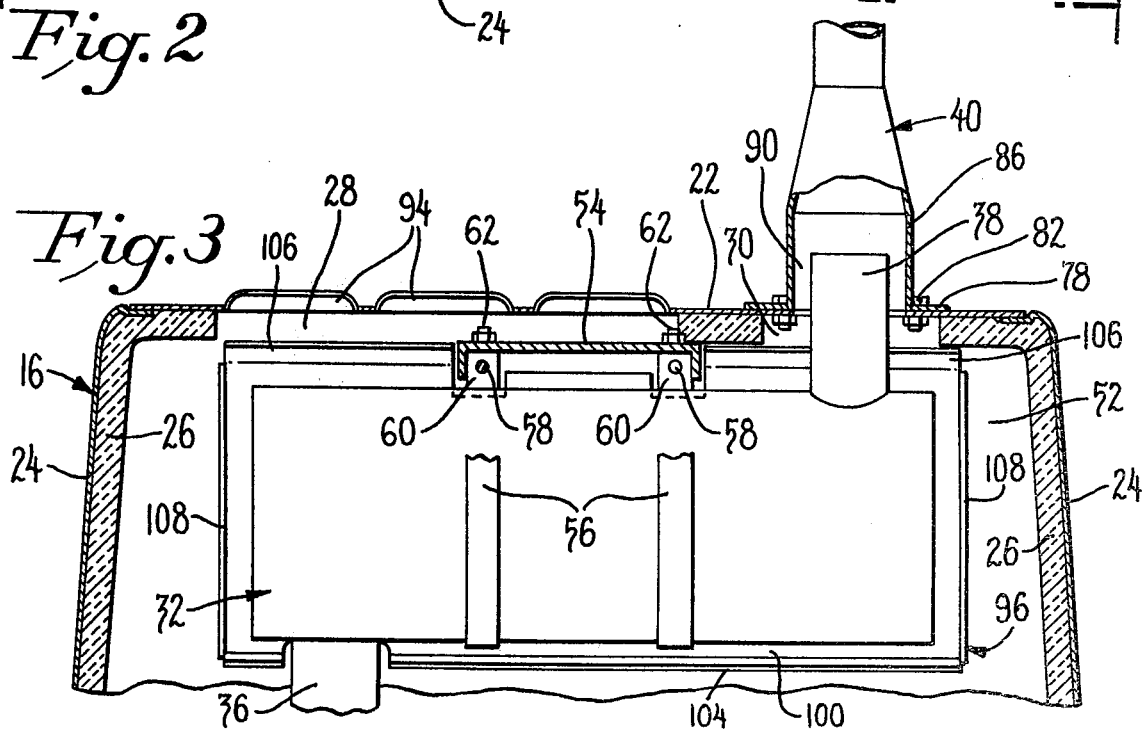
FIG. 3 is a cross-sectional view taken along line 3—3 of FIG. 1.

Referring to FIGS. 1-3 there is disclosed a partial view of a vehicle front end designated generally by the reference character 10 shown with a cowling portion 12 and a nose guard 14 between which a hood 16 is swingable by virtue of a hinge 18 pivoted on the nose guard 14 and attached to the front of the hood 16. In FIG. 1 the hood is shown being raised to its open position which is an inoperative position for the vehicle 10 wherein an engine 20 for powering the vehicle 10 is not operated to drive the vehicle 10 with the hood 16 so open. However, the vehicle 10 is servicable by virtue of the above opening when the hood 16 is swung to its complete open position which is in excess of ninety degrees from the closed position illustrated in FIG. 1. As can be seen from FIG. 3 the hood has a top 22 and sides 24 all of which are heat and sound insulated by liner 26 attached thereto and only cut away for access such as the openings 28 and 30 for the exhaust louvers and stack respectively.

The top 22 and sides 24 of the hood 16 in conjunction with the engine 20 form a compartment housing a muffler 32 and air cleaner 34. A muffler has an inlet 36 connected to the engine 20 and an outlet 38 for discharging the effluent therefrom to a stack 40 attached to and movable with the hood 16. The air cleaner 34 has an outlet 42 connected to the engine 20 and an inlet 44 which receives inlet air for the engine 20 through a rain cap 46 which is attached to and movable with the hood 16. A gasket 48 is supported by the flange 50 on the air cleaner inlet 44 and provides a seal between the rain cap 46 and the air cleaner inlet 44.

While both the exhaust stack 40 and the rain cap 46 are mounted on and movable with the hood 16, the muffler 32 and air cleaner 34 are maintained within the compartment formed by the recess 52 framed by the top 22 and sides 24 of the hood 16 as well as the engine 20. A support member in the form of channel 54 which extends over the length of the top 22 of the hood 16 provides a structure from which the muffler 32 and air cleaner 34 may depend. The channel 54 attaches to the nose guard 14 and extends into the cowling 12 on the opposite side where it is supported free of the hood 16.

As can best be seen in FIG. 3 the muffler 32 has a pair of straps 56 incircling it and attached by bolt 58 to a mounting bracket 60 which in turn is bolted to the channel 54 by the bolt 62. Similarly, the air cleaner 34 has straps 64 retained by bolt 68 and attached to the bracket 70 which in turn is again bolted by bolts 72 to the channel 54 having a pair of spacers 74 therebetween to properly align the air cleaner 34 relative to the hood 16 and the engine 20.

In FIG. 2 both the exhaust stack 40 and air cleaner 34 base plates 78 and 80, respectively, can be seen to be bolted by bolts 82, 84 respectively to the hood 16. Both the stack 40 and the air cleaner 34 can be seen to have necks 86 and 88 overlapping the muffler outlet 38 and air cleaner inlet 34, respectively, to form annuluses 90 and 92 respectively for the connections between the exhaust stack 40 and air cleaner 34. The annuluses 90 and 92 provide sufficient clearance to permit a line of demarcation between the muffler outlet 38 and the air cleaner inlet 44 with respect to the exhaust stack 40 and air cleaner 34 when the hood 16 is moved to its open or inoperative position as shown in phantom and FIG. 1.

In FIGS. 2 and 3 there are exhaust louvers 94 illustrated as being located in the top 22 of the hood 16 which louvers 94 provide an exit for the cooling air passing the muffler 32 as best illustrated by the arrows in FIG. 1. The arrows are indicated coming from the left which would be the location of a radiator fan in a conventional vehicle application where the engine is water cooled or for an engine cooling fan in the case of an air cooled engine and further as a source for cooling air entering the grill within the nose guard 14 of vehicle 10 when it is moving in the forward direction.

It is generally not desirable to allow the air entering the nose guard 14 and passing over, for example, the radiator and other componentry to be cooled including the muffler 32 to thereafter pass through the air cleaner and enter the engine 20. Preferably the cooling air once it has been heated up is discharged as through the louvers 94 where it can be dissipated to the atmosphere. Thus, in the present application a deflector in a form of the scoop 96 is provided to direct the air flow out of the recess 52 and up through the louvers 94 as well as the stack 40.

The scoop 96 can be seen to be formed of an upstanding or vertical portion 98 and a lower portion 100 having a curved portion 102 for making a smooth transition with the upper portion 98. The lower portion 100 has a lip 104 on the edge of the scoop 96 leading into the air flow through the recess 52. Also there is an upper edge 106 for final deflection of the air to the louver 94 and stack 40. In FIG. 3 the scoop 96 can be seen to extend over the length of the muffler 32 and completely block off the path of the air cleaner 34 as best illustrated in FIG. 1. The scoop has side plates 108 to stiffen the upper and lower portions 98 and 100 while at the same time retaining the air flow collected on the scoop 96 for enhancing the directing of the air flow through recess 52 over the scoop 96. The scoop 96 is supported by brackets 110 which are welded to the channel 54 and have bolts 112 passing therethrough and attached to the scoop 96 for attaching the scoop 96 to the brackets 110.

It will be noted that the scoop 96 is located as best illustrated in FIG. 1 between the muffler 32 and air cleaner 34 to form a heat shield therebetween both to reflect the radiant heat of the muffler and the convective heat which would otherwise be carried by the air flow through the recess 52 to the air cleaner 34. Further, the scoop 96 not only increases the air flow past the muffler 32 by use of the lower portion 100 which is oriented directly into the path of the air flow but further increases the velocity and therefore the heat transfer factor by being located in close proximity to the muffler and in general conformity with its shape to form the passage 114 which being restrictive in its area increases the velocity of the air flow directed therethrough. The increased air flow through passage 114 further enhances the cooling of the scoop 96 which would otherwise experience an increase in temperature from the higher energy radiant heat transfer between the muffler 32 and scoop 96.

A scoop 96 also has the function of directing an increase volume of cooling air flow past the muffler outlet 38 through the annulus 90 formed between it and the neck portion 86 of the exhaust stack 40 to thereby simulate a jet pump type action to increase the draft effect on the stack 40. The jet pump type action increases the carrying ability of the air venting the stack in entraining the effluent discharged from the muffler outlet 38 thereby assuring that the effluent does not fall back through the annulus 90 into the recess 52 whereby portions of it, most particularly carbon deposits, would form on the muffler and other engine componentry.

It has also been learned that the configuration of the exhaust stack neck 86 eliminates the need for a rain cap on the stack 40 which has been found to be a requirement where stacks have been directly connected to the muffler outlets allowing rain collecting on the sides of cold stacks to run down into the muffler outlets causing serious corrosion of the muffler. With the diameter of the stack neck 86 in the present application being sufficient to provide clearance for the muffler outlet no water entrained on the sides of the stack was found to enter the exhaust outlet 38.

The present system is enhanced in its operation by the scoop 96 performing not only the conventional deflective and shielding functions for directing of cooling air and shielding of engine components respectively but further is found to enhance heat transfer on the muffler and entrainment of the muffler outlet 38 effluent discharged to the exhaust stack 40 in addition to the above functions. The above advantages permit the further advantage of a compact system wherein the muffler 32 can be located in close proximity to the air cleaner 34 both of which are confined beneath the hood 16 of the vehicle which is insulated for noise attenuation and has no side opernings in the hood 16 for release of heat buildup which would otherwise occur. Thus, the sides 24 of the hood 16 can be maintained as good sound attenuators as well. All of the above advantages are concurrent with easy access to the engine and its componentry by virtue of the hood 16 being free to swing to an inoperative and entirely open position while still being completely operative in a closed position which is obtainable merely by swinging the hood from its open to its closed position whereby the exhaust stack is automatically brought in alignment with the muffler outlet 38 and the air cleaner inlet 44 with the rain cap 46.

In accordance with the provisions of the patent statutes the principle and mode of operation of the system have been explained and what is considered to represent its best embodiment have been illustrated and described. It should, however, be understood that the invention may be practiced otherwise than specifically illustrated and described without departing from its spirit or scope.

I claim:

1. Apparatus for a vehicle engine including a source of cooling air, an exhaust stack and a hood swingable relative to the engine to provide access for servicing the engine, a top, sides and louvers on said hood, said top and sides enclosing the engine to form a compartment for passage of an air path therethrough, said louvers permitting escape of air flow from beneath said hood, a muffler having an inlet and outlet, said muffler inlet connected to the engine, comprising: said exhaust stack mounted on said hood for movement therewith, said muffler outlet exhausting to said stack with said hood in the operative position, said stack overlapping said muffler outlet and having a diameter sufficient to create an annulus between said stack and muffler outlet where they overlap, a deflector located adjacent said muffler, an upstanding portion of said deflector directing at least a portion of the cooling air from its source past said muffler to said stack to vent the air and increase the draft of said stack by increasing the volume and velocity of air through the annulus between said stack and muffler outlet entraining the products discharged from said muffler outlet.

2. The apparatus defined in claim 1 including a lower portion of said deflector and a curved portion thereof forming a smooth transition with said upstanding portion, said lower portion generally directed into the path of the muffler cooling air to force the air onto the upstanding portion thereof.

3. The apparatus defined in claim 1 wherein said deflector extends over said muffler and across the air path.

4. The apparatus defined in claim 1 wherein said deflector conforms to the general shape of said muffler to form a passage between said muffler and deflector of restrictive area where the cooling air velocity is increased.

5. The apparatus defined in claim 1 wherein said deflector has sides thereon for further collecting and directing of the air flow.

6. The apparatus defined in claim 1 including a lower portion of said deflector and a curved portion thereof forming a smooth transition with said upstanding portion, said deflector extending over and conforming generally to the shape of said muffler to form a passage between said muffler and deflector of restrictive area where the cooling air velocity is increased over the portion of the deflector immediately adjacent said muffler and directing the cooling air into said upstanding portion thereof from said lower portion which is generally directed into the path of the cooling air, and sides on said deflector for further collecting and directing of the air flow.

7. The apparatus defined in claim 6 including a support for said muffler located within the compartment and constraining said muffler therein, said deflector including an edge on said upstanding portion in close proximity to said hood, said upstanding portion extending downwardly from said hood to join said lower portion which extends at least to the bottom of said muffler, said louvers being in said hood top adjacent said stack and aligned above and along the longitudinal axis of said muffler to place said deflector immediately there beneath, said deflector sides being between said hood sides and said muffler.

8. The apparatus defined in claim 1 including an air cleaner having an inlet and outlet, said air cleaner outlet connected to the engine and said inlet extending to an inlet in said hood, said air cleaner located adjacent said muffler, said deflector located between said muffler and said air cleaner to shield said air cleaner from the radiant and convective heat emitted from said muffler.

9. The apparatus defined in claim 8 including a rain cover for said air cleaner inlet mounted on said hood for movement therewith, said air cleaner inlet received by said rain cover with said hood in the operative position, and including a support for said air cleaner within the compartment for supporting said air cleaner in a manner constraining it within the compartment resulting in a line of demarcation between said rain cap and said air cleaner upon moving said hood to the inoperative position.

10. The apparatus defined in claim 6 including a support for said muffler located within the compartment and constraining said muffler therein, said deflector including an edge on said upstanding portion in close proximity to said hood, said upstanding portion extending downwardly from said hood to join said lower portion which extends to the bottom of said muffler, said deflector sides being between said hood sides and said muffler.

11. Apparatus for a vehicle engine including a source of cooling air, a hood, a muffler having an inlet and outlet, an exhaust stack mounted on said hood for movement therewith, said hood swingable relative to the engine to provide access for servicing the engine, said muffler inlet connected to the engine, comprising: said muffler outlet exhausting to said stack with said hood in the operative position, said stack overlapping said muffler outlet and having a diameter sufficient to create an annulus between said stack and muffler outlet where they overlap, a deflector located adjacent said muffler, an upstanding portion of said deflector directing a portion of the source of cooling air in a path past said muffler to said stack to increase the draft of said stack by increasing the volume and velocity of air through the annulus between said stack and muffler outlet entraining the products discharged from said muffler outlet.

12. The apparatus defined in claim 11 including a lower portion of said deflector and a curved portion thereof forming a smooth transition with said upstanding portion, said lower portion generally directed into the path of the muffler cooling air to force the air onto the upstanding portion thereof.

13. The apparatus defined in claim 11 wherein said deflector extends over the length of said muffler.

14. The apparatus defined in claim 11 wherein said deflector conforms to the general shape of said muffler to form a passage between said muffler and said deflector of restrictive area where the cooling air velocity is increased.

15. The apparatus defined in claim 11 wherein said deflector has sides thereon for further collecting and directing of the air flow.

16. The apparatus defined in claim 11 including a lower portion of said deflector and a curved portion thereof forming a smooth transition with said upstanding portion, said deflector extending over and conforming generally to the shape of said muffler to form a passage between said muffler and deflector of restrictive area where the cooling air velocity is increased over the portion of the deflector immediatey adjacent said muffler and directing the cooling air into said upstanding portion thereof from said lower portion which is generally directed into the path of the cooling air, and sides on said deflector for further collecting and directing of the air flow.

17. Apparatus for an engine including a cooling air source providing a path of air, a muffler having an inlet and outlet, an exhaust stack and a hood swingable relative to the engine to provide access for servicing the engine, said muffler inlet connected to the engine, an air cleaner having an inlet and outlet and a rain cover therefore, said air cleaner outlet connected to the engine, comprising: said exhaust stack and rain cover mounted on said hood for movement therewith, said air cleaner inlet received by said rain cover with said hood in the operative position, said muffler outlet exhausting to said stack with said hood in the operative position, said stack overlapping said muffler outlet and having a diameter sufficient to create an annulus between said stack and muffler outlet where they overlap, a deflector located between said muffler and said air cleaner and extending over said muffler and across the air path, an upstanding portion of said deflector directing at least a portion of the cooling air from its source past said muffler to said stack to enhance the draft of said stack, said deflector shielding said air cleaner from the radiant and convective heat emitted from said muffler.

18. Apparatus for an engine including a cooling air source, a muffler having an inlet and outlet, and a hood swingable relative to the engine to provide access for servicing the engine, said muffler inlet connected to the engine, said muffler outlet extending through said hood when it is in the operative position, said hood having an opening with a diameter sufficient to create an annulus between said muffler outlet and said hood, an air cleaner having an inlet and outlet and a rain cover therefore, said air cleaner outlet connected to the engine comprising: a deflector located between said muffler and said air cleaner, an upstanding portion of said deflector directing cooling air from said source past said muffler and through the muffler outlet annular hood opening, said deflector shielding said air cleaner from the radiant and convective heat emitted from said muffler, a support member spanning said muffler, deflector and air cleaner, means attaching said muffler, deflector upstanding portion and air cleaner to said support member, said support member, muffler, air cleaner and deflector forming a subassembly for ease of assembly onto said engine of said muffler and air cleaner, means supporting said support member in fixed relation to the engine, said support member being supported independent of the hood.

* * * * *